United States Patent [19]  [11] 3,744,840
Van Cleave  [45] July 10, 1973

[54] TWO-PIECE UNITS LONGITUDINALLY ADJUSTABLE WITH EACH END TERMINATING IN MEANS INTERLOCKING A CAMPER BODY WITH A TRUCK BODY

[76] Inventor: Marvin A. Van Cleave, 5712 Portland Road N.E., Salem, Oreg. 97303

[22] Filed: Sept. 23, 1971

[21] Appl. No.: 182,964

[52] U.S. Cl............................ 296/23 MC, 296/35 R
[51] Int. Cl............................................... B60p 3/32
[58] Field of Search..................... 296/23 MC, 35 A, 296/35 R, 23 R

[56] References Cited
UNITED STATES PATENTS
3,649,065  3/1972  Stutz............................. 296/23 MC
3,399,922  9/1968  Burton............................. 296/23 R Primary Examiner—Philip Goodman
Assistant Examiner—John A. Carroll
Attorney—James D. Givnan

[57] ABSTRACT

A camper and truck body mounting and interlocking means comprising at least four identical two-piece units. One part of each unit is secured to each of the four corners of a truck body for interlocking securement to the other pieces of said units which are secured in like manner to the four corners of the camper body. One part of each unit comprises an anchor plate adapted for either removable or permanent securement to the side walls of the truck body. Each anchor plate has a central opening therethrough for hooked engagement with a hook at the bottom end of the other part of the unit. Said other part also comprises a turnbuckle provided with a companion hook at its top end for engagement with an eye bolt, U-bolt, or the like, secured to and depending from the respective corner of the camper body. The turnbuckle extends upwardly and rearwardly from the truck body into engagement with the U-bolts or clevises of the camper body and thus enables the camper body to be pulled forward into solid and properly positioned securement to the truck body. By this arrangement, whereby lineal forces acting in opposite directions through each of the units, a single couple constituting a single force by the aligned hook components, an equilibrium is produced. Equilibrium is produced relative to the lineal force or forces radiating from the central opening in the anchor plate.

2 Claims, 4 Drawing Figures

PATENTED JUL 10 1973 3,744,840

MARVIN VANCLEAVE
INVENTOR

BY James L. Givnan
ATT'Y

TWO-PIECE UNITS LONGITUDINALLY ADJUSTABLE WITH EACH END TERMINATING IN MEANS INTERLOCKING A CAMPER BODY WITH A TRUCK BODY

This invention relates to improvements in means for positioning and securely holding a camper to a truck bed or body.

The principal objects of the invention are:

To provide camper body and truck body mounting means comprising one part permanently or removably secured to the truck body at four corners thereof, in combination with means universally adjustable in relation to each of said mounting means and thereby rendering the camper body and mounting means adaptable to fit all the popular late model, wide-bed pick-up truck bodies.

To provide mounting means of the character described operable throughout its wide functional range without warping, tearing, puncturing or otherwise mutulating or damaging the side walls or panels of the camper body.

To provide mounting means of the character described made in two parts which when separated and inoperable present a smooth surface on the body of the camper with the other part swingably depending from an inset position from the sides of the camper body in a non-hazardous position thereby preventing injury to passers-by, children and others.

To provide mounting means of the character described which are of pleasing appearance and which may be made of stainless steel, chrome-plated or otherwise treated to present a pleasing appearance.

The foregoing and other objects and advantages which will become subsequently apparent reside in the details of construction and operation as more fully hereinafter described and claimed, reference being had to the accompanying drawings forming a part hereof, and in which:

Figure 1:
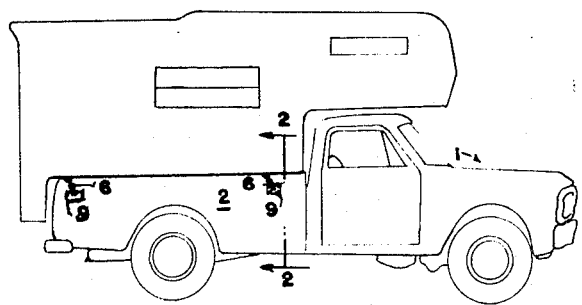
FIG. 1 is a side elevational view of a truck having mounted thereupon and secured thereto a camper body by fastening means in accordance with my invention.

With continuing reference to the drawing wherein like reference characters designate like parts, numeral 1 indicates generally a conventional truck having a conventional body 2 secured thereto in the usual manner.

Figure 2:
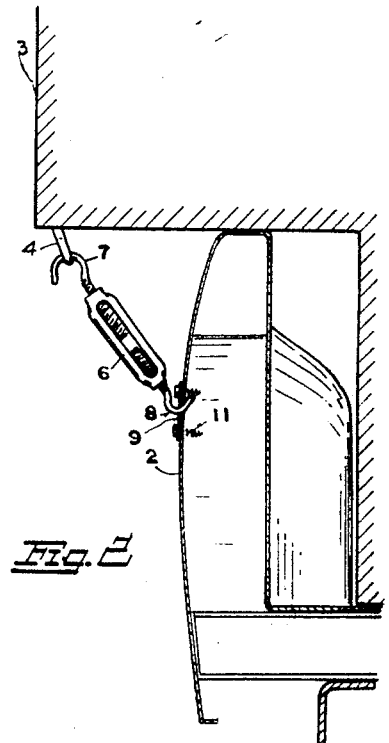
FIG. 2 is a sectional elevational view on an enlarged scale, taken approximately along the line 2—2 of FIG. 1.

The camper body indicated generally at 3 is mounted upon the body and side walls of the truck body as shown in FIG. 2 wherein it will be seen that the width of the camper body may be equal to or greater than the width of the truck body.

An advantage of a wider camper body resides in the fact that a U-bolt, 4 clevis, or other similar fastening element may extend downwardly from the underside of the camper body instead of protruding from the sides thereof.

Figure 3:
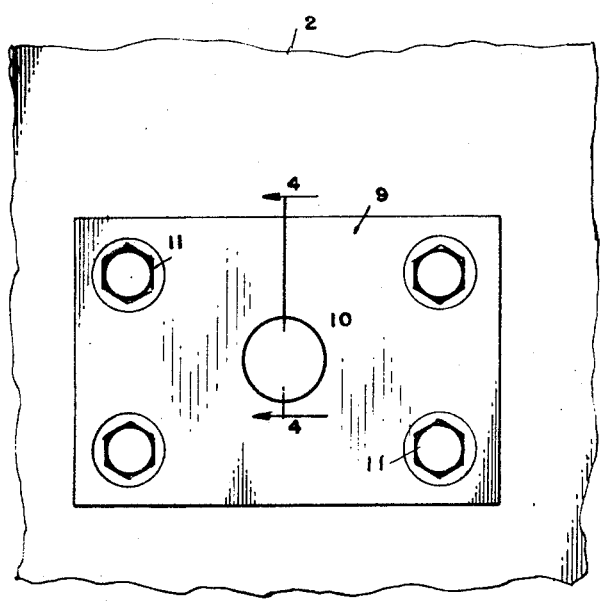
FIG. 3 is an elevational view of a typical anchor plate.
Figure 4:
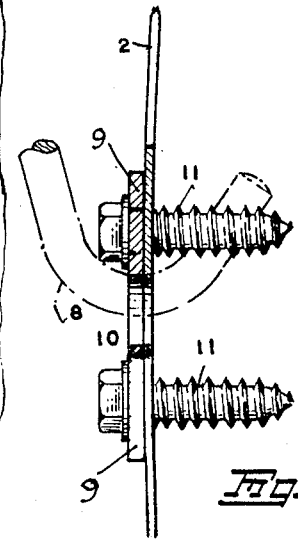
FIG. 4 is a sectional view through the anchor plate taken approximately along the line 4—4 of FIG. 3 and adapted for securement to the truck body by bolts extending therethrough as shown in FIG. 4.

It will also be seen in FIG. 2 that a turnbuckle 6 may be advantageously used by engagement of the top hook 7 thereof with the bottom hook 8 extending through and thus in secure engagement with an anchor plate 9 shown in FIGS. 3 and 4 by extending through a central opening 10.

Each anchor plate 9 is preferably though not restrictively secured to the truck body 2 by means of sheet metal screws 11 extending through apertures 12 in the plate 9 and truck body wall.

It will be readily understood that the combination anchor units 8–9, instead of being tilted rearwardly as shown in FIG. 1, may be just as conveniently positioned at any angle off the verticle forwardly or rearwardly about the pivotal connection of the bottom hook 8 with the opening 10 through the plate. This feature provides a range of adjustment to camper bodies of various lengths.

By this same manipulatory action as the anchor units 9 may be adjusted individually at various angles relative to each other to impart verticle stress loads to the camper body to cause the bottom edge of that body into conformity with the attitude of any forward or rearward inclination of the rims or top edge of the truck body.

Moreover the four corners of the camper body may also be adjusted and secured to the truck body on a common longitudinal and transverse plane.

All of the suggested foregoing adjustments may be quickly and conveniently made by manual rotation of the turnbuckle bodies about their respective bolts or hooks without the use of a wrench or similar tool.

What I claim is:

1. A camper body mounted upon a truck body, said camper body having at least four bottom corners, means securing said camper body to subjacent corner portions of said truck body,
    said truck body having an opening within each of said corner portions,
    secured to the exterior of said truck body, means securing said anchor plates to the walls of said truck body within said corner portions thereof and each having a central transverse opening therethrough aligned with said openings in said truck body
    a turnbuckle having a threaded bolt adjustably extending outwardly from each end thereof,
    said extended end of one of said bolts bent into hook formation for extension through and engagement with said anchor plate,
    hook engaging means secured to and depending from the underside of each corner of said camper body,
    the extended end of the other of said bolts bent into hook formation for engagement with said hook engaging means, whereby tension of said bolts generated by rotation of their respective turnbuckles will be transmitted through said bolts, hooks, anchor plates and hook engaging means for securely locking said camper body in mounted position upon the truck body.

2. Means for securing four corners of a camper to the corresponding corners of a truck body as claimed in claim 1 wherein said hook engaging means depending from said camper body are disposed rearwardly of the points of securement of said anchor plates to said truck body, whereby tension applied to said turnbuckles will pull said camper body forwardly during the mounting operation of the camper body to said truck body.

* * * * *